(12) United States Patent
Hsu et al.

(10) Patent No.: US 10,051,507 B2
(45) Date of Patent: *Aug. 14, 2018

(54) TRAFFIC SHAPING MECHANISM FOR UE POWER SAVING IN IDLE MODE

(71) Applicant: MEDIATEK INC., Hsinchu (TW)

(72) Inventors: Chia-Chun Hsu, New Taipei (TW); Chie-Ming Chou, Taichung (TW)

(73) Assignee: MediaTek Inc., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/320,894

(22) Filed: Jul. 1, 2014

(65) Prior Publication Data

US 2015/0009816 A1    Jan. 8, 2015

Related U.S. Application Data

(60) Provisional application No. 61/842,466, filed on Jul. 3, 2013, provisional application No. 61/842,459, filed on Jul. 3, 2013.

(51) Int. Cl.
*H04W 28/02* (2009.01)
*H04W 52/02* (2009.01)
(Continued)

(52) U.S. Cl.
CPC ......... *H04W 28/0221* (2013.01); *H04L 47/14* (2013.01); *H04L 47/24* (2013.01);
(Continued)

(58) Field of Classification Search
CPC ............. H04W 28/0221; H04W 76/28; H04W 28/0205; H04W 28/0231; H04W 52/0216;
(Continued)

(56) References Cited

U.S. PATENT DOCUMENTS

| 90,092,202 | 4/2009 | Kim et al. ............. 375/295 |
| 30,039,339 | 2/2013 | Rayavarapu et al. ........ 370/331 |

(Continued)

FOREIGN PATENT DOCUMENTS

| CN | 101047984 A | 4/2006 |
| CN | 101821966 A | 10/2007 |

(Continued)

OTHER PUBLICATIONS

International Search Report and Written Opinion of International Search Authority for PCT/CN2014/081590 dated Sep. 28, 2014(11 pages).

(Continued)

*Primary Examiner* — Christopher Crutchfield
*Assistant Examiner* — Tito Pham
(74) *Attorney, Agent, or Firm* — Imperium Patent Works; Helen Mao; Zheng Jin

(57) ABSTRACT

A method of uplink shaping and extending UE in RRC Idle Mode is proposed. The UE processes a data packet to be sent to the network. The data packet is associated with a traffic type. If the data packet belongs to a normal traffic type, then the UE enters RRC Connected mode and thereby transmitting the data packet to the network. If the data packet belongs to a background traffic type, then the UE buffers the data packet and the UE is prohibited from entering RRC Connected mode until a triggering condition is satisfied for uplink transmission. The proposed mechanism achieves power saving by reducing the activity of uplink transmission. In addition, the proposed mechanism also reduces signaling overhead to enhance network efficiency.

20 Claims, 6 Drawing Sheets

(51) Int. Cl.
  *H04W 72/04* (2009.01)
  *H04W 72/12* (2009.01)
  *H04L 12/801* (2013.01)
  *H04L 12/851* (2013.01)
  *H04L 12/823* (2013.01)
  *H04W 76/28* (2018.01)
  *H04W 76/38* (2018.01)

(52) U.S. Cl.
  CPC ......... *H04L 47/32* (2013.01); *H04W 28/0205* (2013.01); *H04W 28/0231* (2013.01); *H04W 52/0216* (2013.01); *H04W 52/0251* (2013.01); *H04W 72/0413* (2013.01); *H04W 72/1242* (2013.01); *H04W 76/28* (2018.02); *H04W 76/38* (2018.02); *Y02D 70/00* (2018.01); *Y02D 70/1262* (2018.01); *Y02D 70/21* (2018.01); *Y02D 70/24* (2018.01); *Y02D 70/25* (2018.01)

(58) Field of Classification Search
  CPC ......... H04W 52/0251; H04W 72/0413; H04W 72/1242; H04L 47/14; H04L 47/24; H04L 47/32
  See application file for complete search history.

(56) References Cited

U.S. PATENT DOCUMENTS

| | | | |
|---|---|---|---|
| 2003/0095560 A1* | 5/2003 | Arita | H04L 12/44 370/431 |
| 2003/0123390 A1* | 7/2003 | Takase | H04L 47/22 370/230.1 |
| 2004/0037286 A1* | 2/2004 | Huang | H04W 72/12 370/394 |
| 2007/0109970 A1* | 5/2007 | Galimberti | H04L 47/10 370/235 |
| 2009/0092202 A1* | 4/2009 | Kim | H04L 1/1887 375/295 |
| 2011/0307795 A1* | 12/2011 | Guillou | G06F 3/04847 715/738 |
| 2012/0163305 A1* | 6/2012 | Nimbalker | H04W 52/0206 370/329 |
| 2012/0165013 A1* | 6/2012 | Nishida | H04W 76/068 455/435.1 |
| 2012/0257501 A1* | 10/2012 | Kucharczyk | H04L 47/30 370/235 |
| 2012/0269154 A1* | 10/2012 | Wang | H04W 72/1242 370/329 |
| 2013/0021995 A1* | 1/2013 | Ehsan | H04W 72/1284 370/329 |
| 2013/0039339 A1* | 2/2013 | Rayavarapu | H04W 76/028 370/331 |
| 2013/0083713 A1* | 4/2013 | Johansson | H04W 52/0225 370/311 |
| 2013/0084869 A1* | 4/2013 | Johansson | H04W 76/04 455/436 |
| 2013/0121181 A1* | 5/2013 | Kikuzuki | H04W 52/0245 370/252 |
| 2013/0242726 A1* | 9/2013 | Zhu | H04L 5/1469 370/229 |
| 2013/0286982 A1 | 10/2013 | Chen et al. | 370/329 |
| 2013/0311918 A1* | 11/2013 | McCoy | G06F 8/38 715/765 |
| 2015/0036569 A1* | 2/2015 | Vannithamby | H04W 76/048 370/311 |
| 2015/0045024 A1* | 2/2015 | Lunden | H04W 48/16 455/434 |

FOREIGN PATENT DOCUMENTS

| | | |
|---|---|---|
| CN | 102045853 A | 10/2009 |
| CN | 102547610 A | 12/2010 |
| CN | 103037481 A | 9/2011 |
| EP | 2579672 A1 | 10/2011 |
| WO | WO2013013073 A2 | 7/2011 |

OTHER PUBLICATIONS

International Search Report and Written Opinion of International Search Authority for PCT/CN2014/081593 dated Sep. 28, 2014(11 pages).
USPTO, Office Action for related U.S. Appl. No. 14/320,873 dated Sep. 24, 2015.
USPTO, Office Action for related U.S. Appl. No. 14/320,873 dated Dec. 27, 2016.
SIPO, search report for the CN patent application 201480035614.1 (no English translation is available) dated Mar. 2, 2018 (8 pages).

* cited by examiner

BUFFER SIZE THRESHOLD (CONDITION 1)

PERIODIC ACCESS (CONDITION 2)

DELAY BOUND CONSTRAINT (CONDITION 3)

CHANNEL QUALITY CONSTRAINT (CONDITION 4)

UE SPEED CONSTRAINT (CONDITION 5)

TRAFFIC SHAPING MECHANISM FOR UE POWER SAVING IN IDLE MODE

CROSS REFERENCE TO RELATED APPLICATIONS

This application claims priority under 35 U.S.C. § 119 from U.S. Provisional Application No. 61/842,459, entitled "Traffic Shaping Mechanism for UE Power Saving in Connected Mode," filed on Jul. 3, 2013; U.S. Provisional Application No. 61/842,466, entitled "Traffic Shaping Mechanism for UE Power Saving in Idle Mode," filed on Jul. 3, 2013 the subject matter of which is incorporated herein by reference.

TECHNICAL FIELD

The disclosed embodiments relate generally to mobile communication networks, and, more particularly, to uplink traffic shaping for UE power saving in RRC Idle mode.

BACKGROUND

Nowadays, popular applications on smartphones have much more sophisticated traffic pattern than what the network architect originally had in mind. It turns out that the existing networks do not support popular applications that well. For example, chattiness of applications where traffic is based on user interaction results in inconstant QoS requirement over time. Another example is "keep alive messages" or background traffic of application or OS where traffic has short and infrequent data sessions. When bringing this type of traffic, it creates a number of issues. First, many always-on applications generate frequent traffic, e.g., for keep alive and status update, which brings significant problems. Second, the signaling in the network has increased a lot due to frequent context establishment and release, e.g., for Connected—Idle transitions. In many networks, this becomes a severe dimensioning problem for the whole network. Third, the UE batter life is short. Finally, for devices that generate always-on sparse traffic, the overhead is very large as compared to the data payload transmission.

In 3GPP LTE/LTE-A systems, operations could be divided to two radio resource control (RRC) states: RRC_CONNECTED and RRC_IDLE. In RRC_CONNECTED mode, an eNB would keep UE's context (security, id) and process radio resource management (RRM) for that UE. RRM here includes data scheduling, link monitoring (MCS adaption), handover, etc. A UE is ensured to make seamless data transmission with eNB when the UE is in RRC_CONNECTED mode. The eNB may command UE to perform RRM measurement and make handover (HO) decisions after receiving reports that indicate serving cell's signal quality is not good. Inter-eNB negotiation on exchanging UE's information would be handled in RRC_CONNECTED mode.

Since radio resources are limited and network loading is also restricted (by buffer size, backhaul capacity), it is impossible to keep all UEs in RRC_CONNECTED mode. An eNB may release part of UEs and command them to go to RRC_IDLE mode. The release decision may depend on (1) how long a UE does not have any activity, (2) UE's access priority, and (3) QoS. Once a UE goes to RRC_IDLE mode, eNB would release UE information. A UE would perform cell reselection when it finds its camped cell is getting weaker and try to re-synchronize with a new cell. An idle UE will try to re-establish its RRC connection when data arrives. The procedures comprise: a) random access process to synchronize the uplink timing, b) capabilities negotiations authorizations, and network perform admission control, and c) set up operating parameters if UE is allowable to access the network. For uplink transmission, the UE would further send buffer status report (BSR) to request UL grant.

Based on current LTE specification, it is expected that an RRC transition would consume a lot of signaling and cause a lot of delay. When traffic is spare and small, it would be very inefficient to make the transmission since most UE would be kept in IDLE and need to re-establish the RRC connection. As a result, LTE/LTE-A system needs an enhancement to deal with the problem.

It has been shown that although there has only 30% data traffic oriented from smartphone device, they would contribute 80% signaling traffic. This means that new data services have significant impacts on User-plane and Control-plane performance. Unfortunately, the impacts could not be handled well by conventional protocol, and system capacity would be reduced. Furthermore, it has been observed that background traffic is usually small and arrives at long interval while Discontinuous Reception Mechanism (DRX) may not work efficiently under this profile and increase frequent RRC state transition. As a result, UE battery life would be degraded while running those smartphone applications.

To solve the problems, two issues shall be studied. First, how to decide when to send UE to RRC_IDLE mode. In general, the decision relies on a proper RRC release timer that is controlled by eNB. The timer is re-started upon transmitting each packet, and if the timer is expired, UE is released. The timer ideally shall be configurable based on running applications, but how to achieve the objective is unclear. Second, how to decide when to resume RRC connection. Traditionally, when a packet arrives at UE buffer, UE will decide to access with eNB to transmit that packet as soon as possible. However, considering delay-tolerant data applications, it is not necessary to trigger the transmission right away. Therefore, it is proposed that UE can have intelligence and mechanism to decide whether to postpone the transmission and when the transmission shall happen for additional power saving.

SUMMARY

A traffic shaping mechanism is proposed for device modem to aggregate uplink traffic arrived during UE in RRC Idle mode. The mechanism achieves power saving by reducing the individual activity of uplink transmission. In addition, the proposed mechanism also reduces signaling overhead to enhance network efficiency.

In one novel aspect, a method of uplink shaping and extending UE staying in RRC Idle Mode longer is proposed. The UE processes a data packet to be sent to the network. The data packet is associated with a traffic type. If the data packet belongs to a normal traffic type, then the UE enters RRC Connected mode and thereby transmitting the data packet to the network. If the data packet belongs to a background traffic type, then the UE buffers the data packet and the UE is prohibited from entering RRC Connected mode until a triggering condition is satisfied.

In one embodiment, the triggering condition belongs to one of the following: the UE entering RRC Connected mode, fulfilling a predefined buffer, delaying the date packet for a periodicity, at least one of the buffered data packets has reached a delay bound, a channel quality is above a channel quality threshold, and a UE speed is slower than a speed threshold.

In one embodiment, a controller (UE, eNB, or MME) may choose one of the shaping mechanism or a hybrid implementation to meet its requirement. For example, UE can determine to apply which mechanism and triggering condition(s) based on at least one of the channel quality of the UE, the UE speed, a UE battery life, a UE screen status, traffic type, and network loading.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
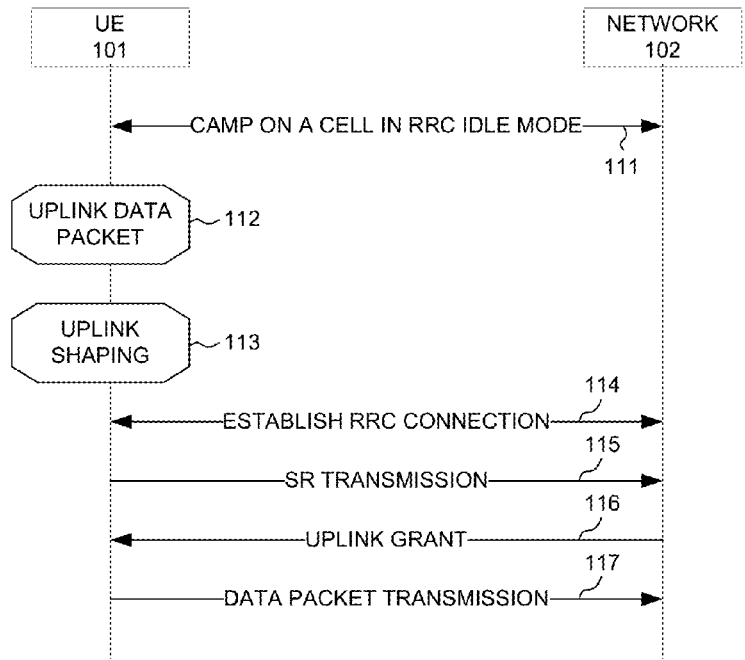
FIG. 1 illustrates a top-level signaling procedure for uplink shaping in RRC Idle mode in accordance with one novel aspect.

FIG. 1 illustrates a top-level signaling procedure for uplink shaping in RRC Idle mode in accordance with one novel aspect. In step 111, a user equipment UE 101 establishes camps on a cell in network 102. UE 101 is in RRC Idle mode. In step 112, UE 101 receives a packet to be transmitted to the network. In legacy systems, upon uplink packet arrival, the UE should enter RRC Connected mode and perform uplink transmission. However, when traffic is delay tolerant and packet size is small, it is very inefficient to make the transmission immediately since most UE would be kept in RRC Idle mode that need to re-establish the RRC connection. Frequent RRC Connected-Idle state transition will bring significant signaling and degrade power saving performance.

In accordance with one novel aspect, in step 113, UE 101 performs uplink shaping before entering RRC Connected mode. The intention of uplink shaping is to prevent frequently resume RRC Connected mode when UE is in RRC Idle mode. Uplink shaping in RRC Idle mode is a kind of buffering where the UE buffers and aggregates the uplink packets into a layer-2 buffer and then enters RRC Connected mode to clear the buffer in one session until a later time. Uplink shaping can be interpreted as a virtual state called shaping state during UE behavior. When a packet arrives at RRC Idle mode, UE should shape the data and make the transmission when satisfying certain condition(s). Under uplink shaping, the power consumption and signaling overhead remain the same as RRC Idle mode, but the benefit is UE would have a shortened stay in RRC Connected mode and less RRC transitions (RRC Connected mode <-> RRC Idle mode). In step 114, UE 101 establishes an RRC connection with the network upon satisfying a triggering condition. In step 115, UE 101 sends out a scheduling request (SR) to network 102. In step 116, UE 101 receives an uplink grant from network 102 in response to the scheduling request. Finally, in step 117, UE 101 transmits the uplink data packet to the network.

Figure 2:
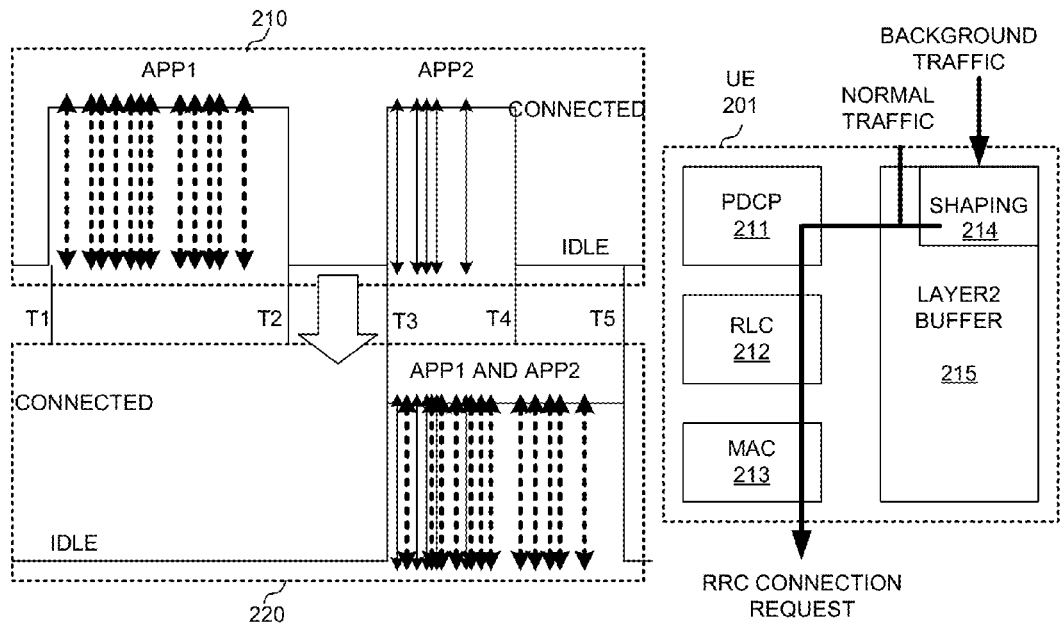
FIG. 2 illustrates uplink shaping for different traffic type in RRC Idle mode in accordance with one novel aspect.

FIG. 2 illustrates uplink shaping for different traffic type in RRC Idle mode in accordance with one novel aspect. In the example of FIG. 2, UE 201 comprises several protocol layer processing modules including a packet data convergence protocol (PDCP) module 211, a radio link control (RLC) module 212, a media access control (MAC) module 213, a shaping module 214, and a layer2 buffer 215. Suppose UE 201 has two applications running, APP1 and APP2. As depicted by box 210, UE 201 encounters traffic from APP1 during time T1-T2 period, and therefore enters RRC Connected mode for uplink transmission. UE 201 then goes back to RRC Idle mode from T2-T3. Later, UE 201 again encounters traffic from APP2 during time T3-T4 period, and therefore enters RRC Connected mode again for uplink transmission. UE 201 then goes back to RRC Idle mode from T4. If the traffic from APP1 is a background traffic type, e.g., type of traffic that is associated with UE in a background mode and/or the data packet has a low QoS requirement and/or the data packet has a small packet size, then UE 201 can buffer the data and delay the uplink transmission until a later time.

In accordance with one novel aspect, as depicted by box 220, UE 201 encounters traffic from APP1 during time T1-T2 period, and checks whether the traffic type is background traffic or normal traffic via shaping module 214. If the traffic type is normal traffic, then UE 201 follows the same procedure as depicted by box 210-UE 201 enters RRC Connected mode for uplink transmission. On the other hand, if the traffic type is background traffic, then UE 201 buffers the data packets into layer-2 buffer 215 and stays in RRC Idle mode from time T1 to T3 to save power. At time T3, UE 201 again encounters traffic from APP2. Based on certain triggering condition, UE 201 decides to enter RRC Connected mode for uplink transmission for both APP1 traffic and APP2 traffic from time T3 to T5. Because UE 201 performs uplink shaping for background traffic from APP1, UE 201 is able to delay the uplink transmission until a later time and stay in RRC Idle mode longer for extra power saving.

Figure 3:
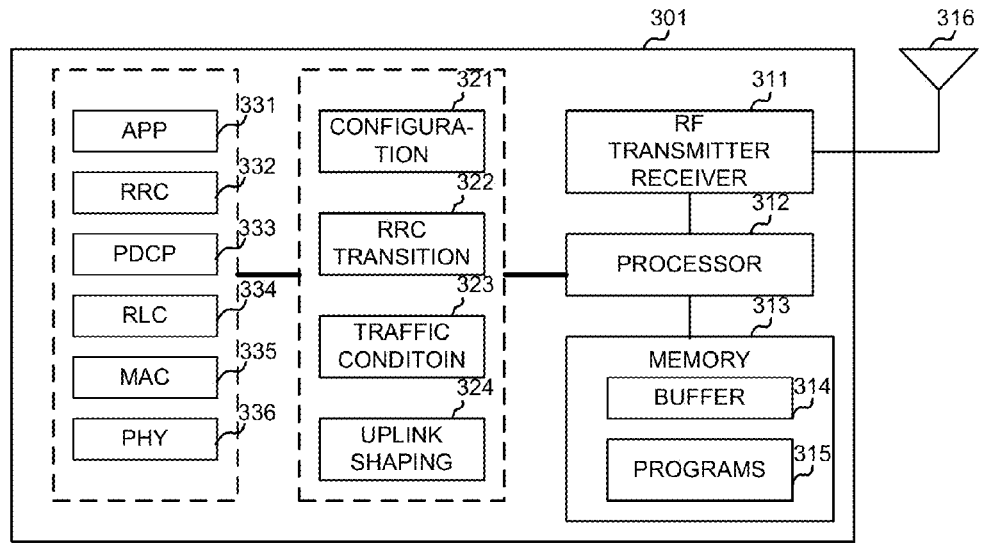
FIG. 3 illustrates an exemplary block diagram of a UE that supports some embodiments of the invention.

FIG. 3 illustrates an exemplary block diagram of a UE 301 that supports some embodiments of the invention. The UE has RF transceiver module 311, coupled with antenna 316, receives RF signals from antenna 316, converts them to baseband signals and sends them to processor 312. RF transceiver 311 also converts received baseband signals from the processor 312, converts them to RF signals, and sends out to antenna 316. Processor 312 processes the received baseband signals and invokes different functional modules to perform features in the UE. Memory 313 stores buffer 314 and program instructions and data 315 to control the operations of the UE. UE 301 also comprises several protocol layer stacks including application layer APP 331, radio resource control layer RRC 332, packet data convergence protocol layer PDCP 333, radio link control layer RLC 334, media access control layer MAC 335, and physical layer PHY 336.

FIG. 3 further illustrates functional modules 321 to 324 in the UE that carry out embodiments of the current invention. The functional modules may be implemented by hardware, firmware, software, or any combination thereof. Configuration module 321 receives configuration parameters from the network (e.g., RRC parameters) and performs various control and configuration functions accordingly. RRC transition module 322 determines whether and when to transit between RRC Connected and Idle mode based on RRC parameters. Traffic condition module 323 determines uplink traffic type, e.g., either background traffic or normal traffic, as well as various traffic status associated with the uplink traffic, e.g., packet buffer size and packet delay bound. Uplink shaping module 324 determines when to perform uplink shaping based on the uplink traffic type. Uplink shaping module 324 also determines when to stop shaping and perform uplink transmission based on various triggering conditions. In this invention, five triggering conditions are proposed to stop uplink shaping and resume RRC connection. A controller (e.g., UE or base station (eNB) or mobility management entity (MME)) can determine to apply which shaping mechanism(s).

Figure 4A:
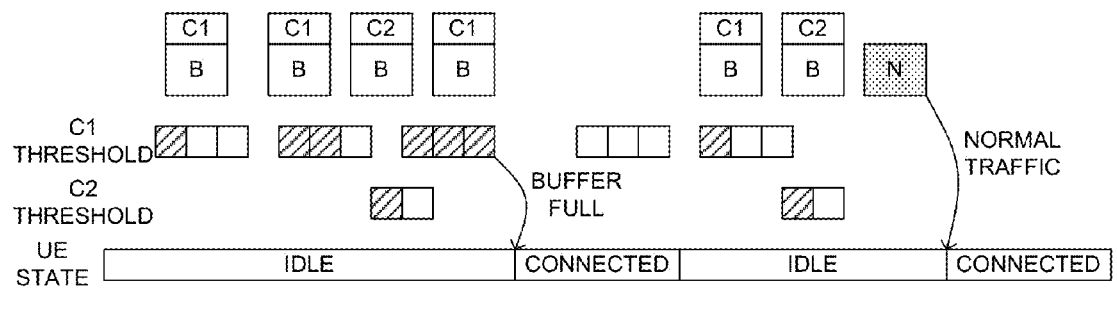
FIG. 4A illustrates a first triggering condition 1 (buffer size threshold) for uplink shaping.
Figure 4B:
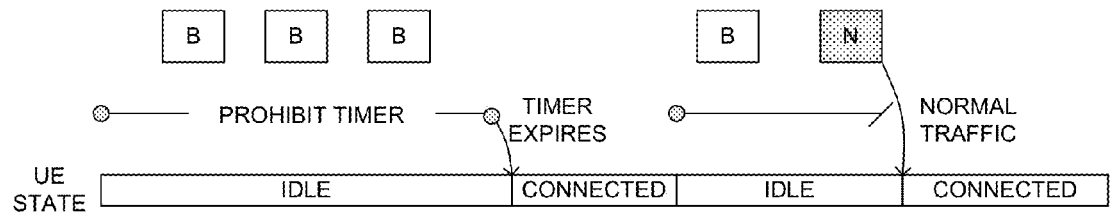
FIG. 4B illustrates a second triggering condition 2 (periodic access) for uplink shaping.

FIG. 4A illustrates a first triggering condition 1 (buffer size threshold) for uplink shaping. In this example, uplink shaping is performed by UE only after a predefined buffer is full for at least one background traffic class or application type. In the example of FIG. 4B, traffic class C1 has a predefined buffer size (e.g., 3 packets), and traffic class C2 has another predefined buffer size (e.g., 2 packets). For background traffic type, the UE keeps buffering each packet according to its traffic class until a corresponding buffer is full. If the buffer for C1 is full, then the UE is allowed to enter RRC Connected mode. If the uplink traffic has a normal traffic type, then the UE enters RRC Connected mode right away, regardless of whether each of the buffers is full or not.

The buffer size can be interpreted as number of packets or total size of packets, e.g., 3 packets in the buffer or 1600 bytes in the buffer. The buffer size can be decided by 1) UE-specific physical memory size in the device (e.g., 10% memory full); 2) buffer size threshold can be specified by the network (e.g., number of bytes that can be carried in a single subframe, which is calculated assuming certain channel quality and corresponding MCS (modulation and coding scheme)); 3) type of application (e.g., different applications can have different buffer size thresholds).

When this mechanism is used, the timing of stopping shaping may become unpredictable and QoS may be degraded severely. Therefore, this mechanism can be applied to selective traffics, e.g., best efforts, while delay sensitive traffics, e.g., signaling, can skip applying this mechanism. If controller is an eNB, the eNB can signal the buffer size threshold to UE upon RRC release/reject. Depending on the configuration, the threshold can be applied for just one idle session or as long as the condition (e.g., background mode) is valid.

FIG. 4B illustrates a second triggering condition 2 (periodic access) for uplink shaping. In this example, for background traffic, a prohibit timer is used to prohibit uplink transmission until the timer expires. While the timer is running, UE buffers uplink packets and is not allowed to enter RRC Connected mode. Only when the timer is expired, the UE is allowed to initiate connection request and upload the buffered packets for uplink transmission. The prohibit timer is re-started upon buffer becomes empty and/or the UE is release to RRC Idle mode. For normal traffic type, the UE is allowed to establish connection once packet arrives regardless whether the prohibit timer is running or not.

In this example, the triggering condition for uplink transmission is based on periodic access via the prohibit timer. If the timer is configured by eNB, the eNB may assign a dedicated PRACH resource (e.g., physical resource or preamble) to enable the UE trigger contention-free random access. The value of the prohibit timer may be decided according to QoS requirement. An example is to set the value as minimum delay requirement for the union of the QoS requirement of the existing bearer. Therefore, the prohibit timer would be UE-specific and based on at least one of its running applications. If controller is an eNB, the eNB need to specify the period upon RRC release/reject. Depending on the configuration, the threshold can be applied for just one idle session or as long as the condition (e.g., background mode) is valid.

Figure 4C:
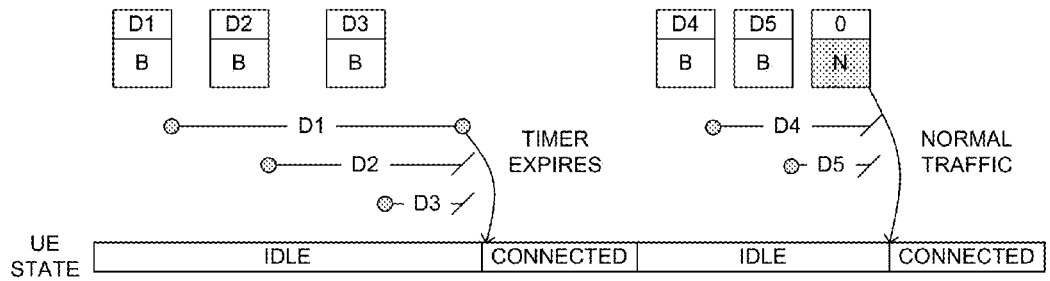
FIG. 4C illustrates a third triggering condition 3 (delay bound constraint) for uplink shaping.

FIG. 4C illustrates a third triggering condition 3 (delay bound constraint) for uplink shaping. In this example, uplink shaping is stopped when at least one of the buffered data is going over its maximum tolerable delay. If the buffered time of the packet configured for shaping is smaller than the delay bound, then UE is not allowed to enter RRC Connected mode. If the buffered time exceeds the delay bound, then the UE is allowed to enter RRC Connected mode. Such mechanism can bound the delay for concerned applications. For different types of background traffic and application, different delay timers are assigned to each packet. For example, delay values of D1, D2, and D3 are assigned to three background packets B1, B2 and B3 of different applications respectively. When packet B1 has reached its delay bound D1, the triggering condition for uplink transmission is satisfied.

The delay constraint shall consider the latency of resuming RRC connections. For example, if RRC setup latency is 50 ms and delay requirement is 500 ms under this QCI, then the delay constraint for the shaping is 450 ms. The UE needs to record arriving timing and count the delay of each individual packet or application. For example, for the data of the same application, the UE only needs to count the delay of the first packet. For normal traffic type, the UE is allowed to initiate connection once packet arrives regardless whether the delay timer is running or not (e.g. a special case is the delay timer is 0 for normal traffic). For example, delay values of D4 and D5 are assigned to two background packets B4 and B5 respectively. When normal packet N arrives, the UE is allowed to establish connection immediately although none of the delay timers for D1 and D2 has expired yet.

Figure 4D:
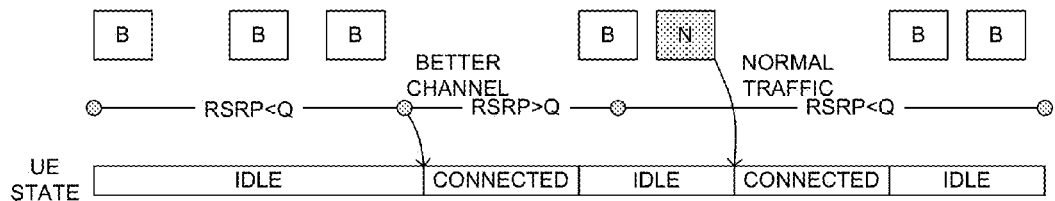
FIG. 4D illustrates a fourth triggering condition 4 (channel quality constraint) for uplink shaping.

FIG. 4D illustrates a fourth triggering condition 4 (channel quality constraint) for uplink shaping. In this example, RRC establishment is performed only when UE's channel quality is above a predefined threshold or the estimated transmit power is lower than certain threshold or the estimated pathloss is lower than certain threshold. The UE can determine the channel quality and the estimated TX power by 1) DL pathloss measurement; 2) preamble power ramping; and 3) camping cell measurement such as RSRP/RSRQ. When using transmit power as the shaping constraint, the purpose is to prevent UE initiating transmission in bad coverage and waste extra power on failed attempt or in non-linear region of the PA. If the required transmit power is higher than the predefined threshold or channel quality is lower than the predefined threshold, and if the data is delay tolerant (background traffic), the UE delays the UL transmission until the channel becomes better for certain amount of time. If controller is an eNB, the eNB needs to specify the threshold upon RRC release/reject.

Figure 4E:
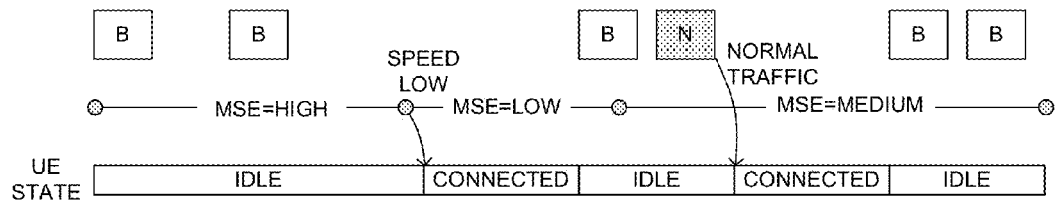
FIG. 4E illustrates a fifth triggering condition 5 (UE speed constraint) for uplink shaping.

FIG. 4E illustrates a fifth triggering condition 5 (UE speed constraint) for uplink shaping. In this example, uplink shaping is initiated when UE speed is higher than a defined threshold whereby the UE will try to keep in RRC Idle mode to avoid frequent handovers when staying in RRC connected mode. For background traffic, when UE speed is high, the UE is not allowed to enter RRC Connected mode for uplink transmission. Uplink shaping is stopped when UE speed is low whereby the UE will be kept in RRC Connected mode longer due to less handovers. For normal traffic, UE is allowed to establish connection regardless of UE speed. The UE can determine its speed by counting its cell change count or using physical speed. The UE speed may be determine based on mobility state estimation (MSE) performed by the UE. For example, MSE=normal corresponds to UE speed low for satisfying uplink transmission triggering condition, while MSE=medium and MSE=high correspond to UE speed high. If controller is an eNB, the eNB needs to specify the threshold or qualification upon RRC release/reject.

Different conditions can meet the requirement of different use cases and tradeoff between complexity and gain. The controller may choose one of the conditions or a hybrid implementation to meet is requirement. For example, UE can determine to apply which mechanism and triggering condition(s) based on at least one of the channel quality of the UE, the UE speed, a UE battery life, a UE screen status, traffic type, and network loading. In one example of combining condition 2 and 5, UE speed is first quantified into a number of groups, different shaping period is then assigned to different speed group.

Figure 5:
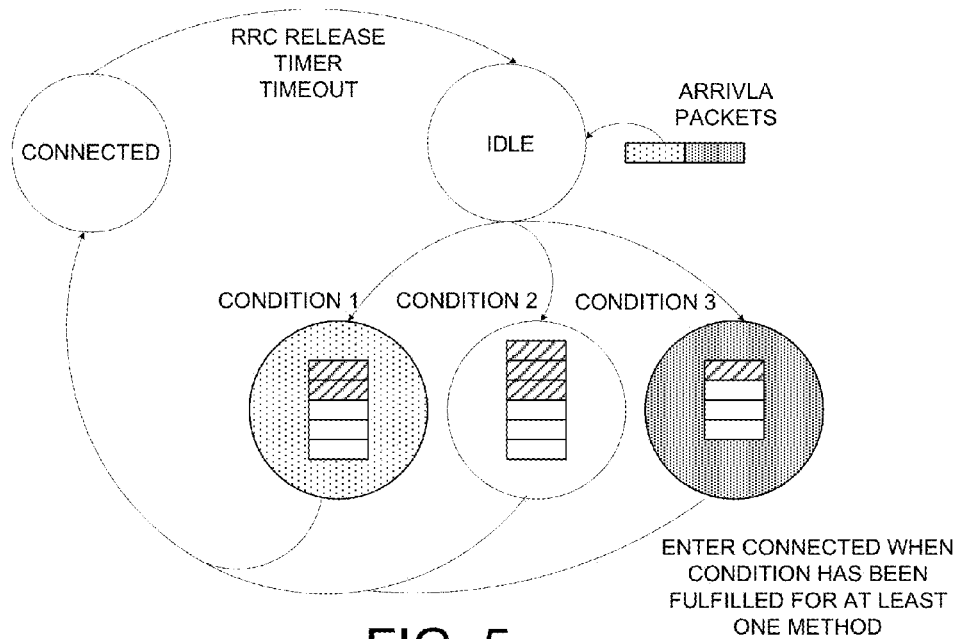
FIG. 5 illustrates one embodiment of hybrid uplink shaping for RRC Idle mode.

FIG. 5 illustrates one embodiment of hybrid uplink shaping for RRC Idle mode. In the embodiment of FIG. 5, the UE may label the arrived packets and apply different shaping conditions and track the shaping state individually. For example, packets belonged to best effort services may apply to shaping condition 1 (buffer size threshold), and alternatively, packets belonged real-time services may apply to shaping condition 3 (delay bound constraint). Once at least one of the conditions was fulfilled, the UE would enter connected mode and upload all buffered packets for uplink transmission. After UL transmission, the UE clears the buffer and updates the corresponding shaping state.

Figure 6:
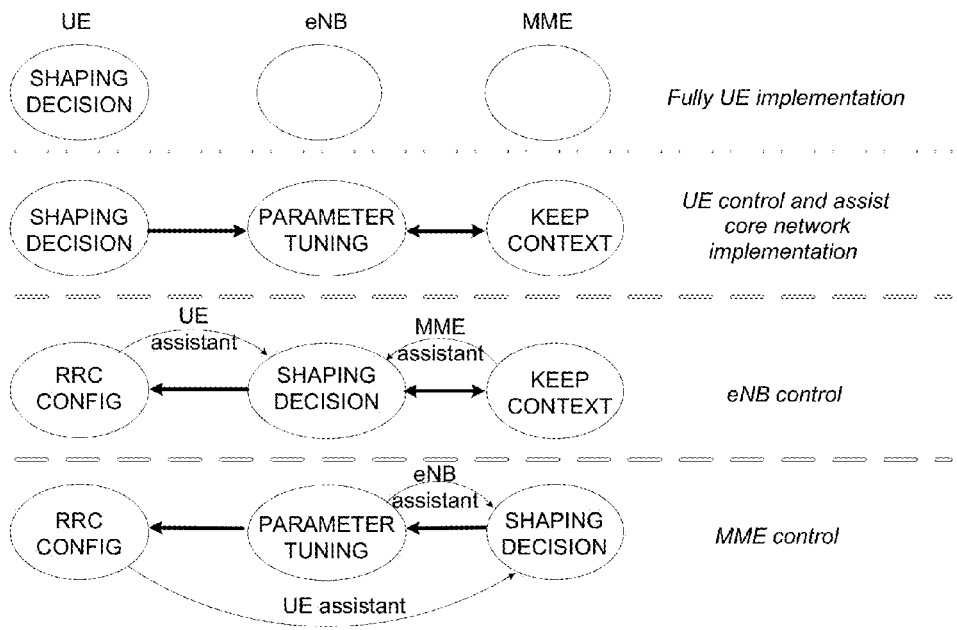
FIG. 6 illustrates various options for uplink shaping implementation.

FIG. 6 illustrates various options for uplink shaping implementation. There are four different implementation options. In a first option, uplink shaping is based on full UE implementation. The UE makes shaping decision on its own completely. In a second option, uplink shaping is based on UE control and network assistance. In a third option, uplink shaping is based on eNB control, possibly with UE and MME assistance. In a fourth option, uplink shaping is based on MME control, possibly with UE and eNB assistance.

With full UE implementation, UE decides which shaping mechanisms and associated settings are used for its uplink packets and UE could automatically activate and deactivate shaping. UE may activate the uplink shaping when the UE 1) is in background mode; 2) batter level is low; 3) moving with high speed; 4) the screen is OFF; 5) observing the cell is barred; 6) channel quality is not good; and 7) frequent RRC transition is identified. Under full UE implementation, no negotiations are required between UE and eNB, and MME is unaware of the shaping. Therefore, there is no signaling over the air under this implementation. UE is able to change the shaping mechanism dynamically (e.g., apply different shaping mechanisms based on application/user status).

Figure 7:
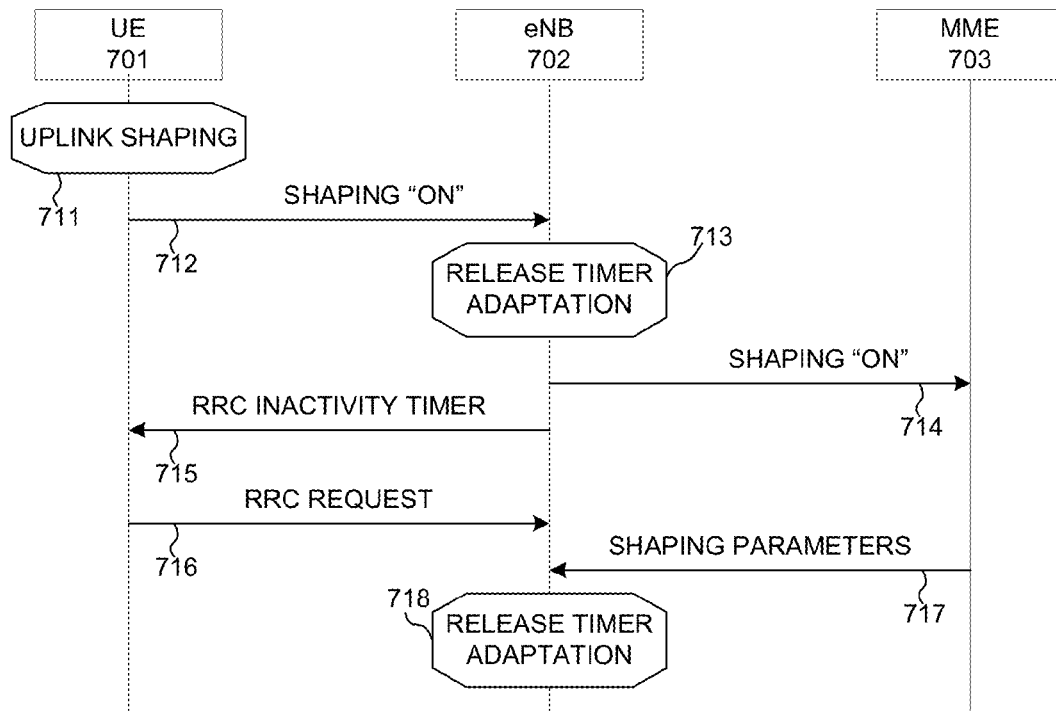
FIG. 7 illustrates one embodiment of UE-controlled and network-assisted uplink shaping signaling procedure.

FIG. 7 illustrates one embodiment of UE-controlled and network-assisted uplink shaping signaling procedure. In this embodiment, UE decides the shaping mechanism and parameters and then reports the decision to eNB. For example, the UE reports the buffer size to core network if condition 1 is used. The UE reports the shaping period to the core network if condition 2 is used. Consequently, the eNB may poll the UE or assign a contention-free RA based on the shaping period. Alternatively, the UE may choose to only indicate whether uplink shaping is ON or is OFF. In addition, the UE may report the uplink shaping information during RRC re-establishment and it may skip the indication if the serving cell is identical to the previous report target cell.

When the UE reports the shaping parameters, the eNB could reconfigure a RRC release timer based on the report. The eNB may signal the value of RRC release timer to the UE after adaption and forward the information to MME and the MME stores the context. Furthermore, the MME may forward the information to the next serving eNB to facilitate the RRC configurations when the UE returns. The MME may release the context upon UE detach or when a timer expires. The timer is started or restarted upon each time the UE comes back to the network. The UE may also update the shaping mechanism to the core network when performing TAU. Consequently, the MME could forward that information to eNB when the UE return or the MME could command eNB on the parameter tuning.

In the example of FIG. 7, in step 711, UE 701 activates uplink shaping based on certain criteria. In step 712, UE 701 indicates shaping "ON" to eNB 702, e.g., through RRC message such as RRC setup complete message. In step 713, eNB 702 performs RRC adaptation based on the shaping information. In one example, eNB 702 configures the RRC release timer based on shaping mechanism. In step 714, eNB 702 forwards the corresponding shaping information to MME 703 by initial UE message. In step 715, eNB 702 sends RRC release timer to UE 701. Later on, in step 715, UE 701 comes back and sends an RRC request to eNB 702. UE 701 may skip the negotiation but MME 703 will forward shaping information to eNB 702 (step 717). Finally, eNB 702 performs RRC release timer adaptation based on the shaping information (step 718).

Figure 8:
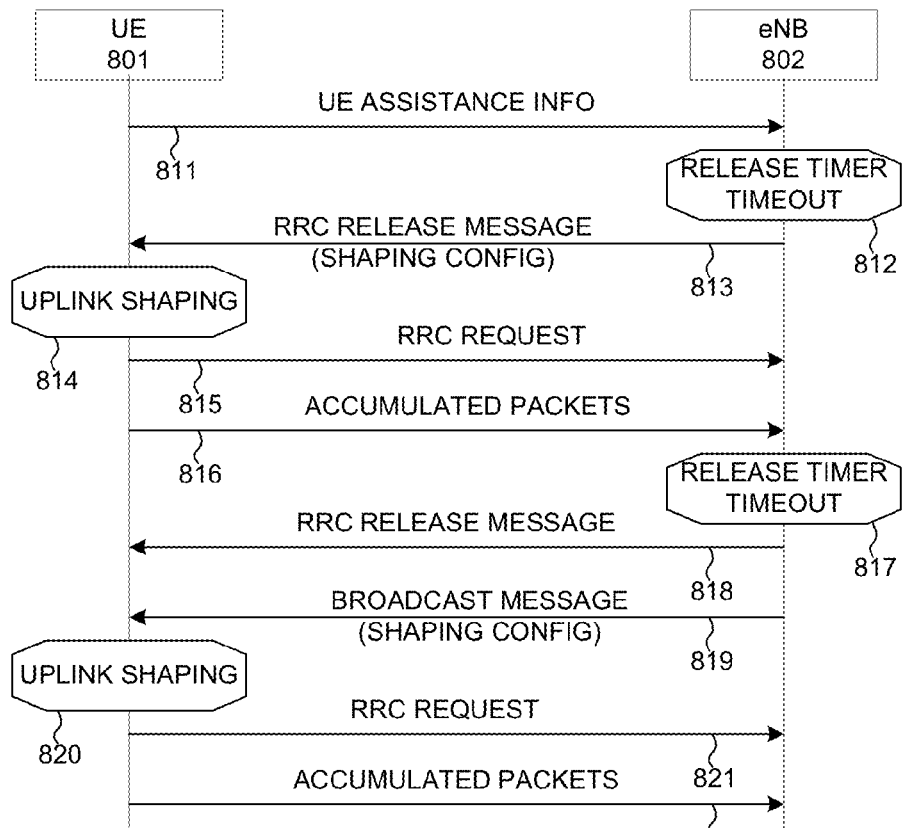
FIG. 8 illustrates one embodiment of eNB-controlled uplink shaping signaling procedure.

FIG. 8 illustrates one embodiment of eNB-controlled uplink shaping signaling procedure. In this embodiment, the eNB configures shaping parameters before UE goes to idle and activate/deactivate the shaping. The activation and deactivation could be signaled by SIBS (cell specific or group specific), paging message (cell specific or group specific), or dedicated RRC message (UE specific). The activation and deactivation of shaping may be implied by shaping configuration. Alternatively, UE only performs shaping according to broadcast message.

For cell or group specific uplink shaping, the eNB may activate the mechanism based on statistics: 1) when the cell loading is heavy (larger than a threshold); 2) to prevent high speed UE accessing the cell (UE speed higher than a threshold); 3) to prevent UE with bad coverage accessing the cell (channel quality worse than a threshold); 4) to prevent UE with frequent RRC transition accessing the cell (more frequent than a threshold); 5) to prevent UE with small data accessing the cell (smaller than a threshold); and 6) UE's QoS is not the main concerning. For dedicated uplink shaping, UE may also provide shaping assistance for shaping decisions. The assistance information includes: 1) UE speed information; 2) UE traffic pattern and RRC transition history; 3) power consumption preference; 4) the ability to support shaping; and 5) background mode.

In the example of FIG. 8, in step 811, UE 801 sends UE assistance information to eNB 802. In step 812, the RRC release timer expires, and eNB 802 sends an RRC release message to UE 801, releasing UE 801 to RRC Idle mode (step 813). In addition, eNB signals shaping configuration to UE 801 through the RRC release/reject message or RRC reconfiguration message. The shaping configuration may be simplified by using a defined profile with a shaping ID. Upon RRC release/reject, eNB indicates whether the shaping mechanism is just for the coming idle session or until the UE makes TAU (tracking area update) or shaping can be applied continuously as long as shaping condition is satisfied. If the shaping mechanism is just for one idle session, UE shall release that configuration when it enters RRC Connected mode. If the shaping mechanism is continuous, the eNB may further specify the exit condition, e.g., the shaping become invalid after N times of RRC transition, or exit background mode, or channel quality is better than a threshold, etc. In addition, a timer is used to prevent UE being stuck in uplink shaping forever.

In step 814, UE 801 performs uplink shaping based on traffic type. In step 815, UE 801 sends an RRC request to eNB 802 for entering RRC Connected mode, and the RRC request includes shaping configuration. In step 816, UE 801 sends accumulated uplink traffic to eNB 802. In step 817, the RRC release timer expires, and eNB 802 sends an RRC release message to UE 801, releasing UE 801 to RRC Idle mode (step 818). In step 819, eNB 802 broadcasts shaping configuration (e.g., via SIBS). In step 820, UE 801 performs uplink shaping based on the shaping configuration. Later, upon satisfying a triggering condition for uplink transmission, UE 801 again sends an RRC request to eNB 802 for establishing an RRC connection (step 821). In step 822, UE 801 sends accumulated data packets to eNB 802 in RRC Connected mode.

According to shaping configuration, eNB further decides the RRC release timer toward that UE. For example, RRC release timer is shorten if uplink shaping is configured, the value of RRC release timer is optionally signaled to UE, and the value of RRC release timer is optionally forwarded to MME. For example, if shaping condition 2 is used, eNB optionally configure a contention-free RA (dedicated PRACH slot) to the UE. The eNB optionally forwards the shaping configuration to MME and MME stores the context. When the UE returns to the network from RRC Idle, the MME may forward the stored configuration to the serving eNB.

Alternatively, eNB only controls when to activate and deactivate the uplink shaping. When UE receives the commands, UE could decide what kind of shaping mechanism is used and further determine the parameters. The activation and deactivation of uplink shaping can be indicated by broadcast message (SIB/paging) or dedicated message (RRC). If eNB knows a UE in shaping mode, eNB adapts RRC release timer for the UE. Upon connection establishment or by request, UE reports what shaping it adopted and associated parameters. The eNB may receive the assistance information from MME and/or UE. If assistance information is received from both entity, then the information from UE has the higher priority. The eNB uploads the UE's assistance information and/or shaping configuration to the MME to assist follow up operation.

Figure 9:
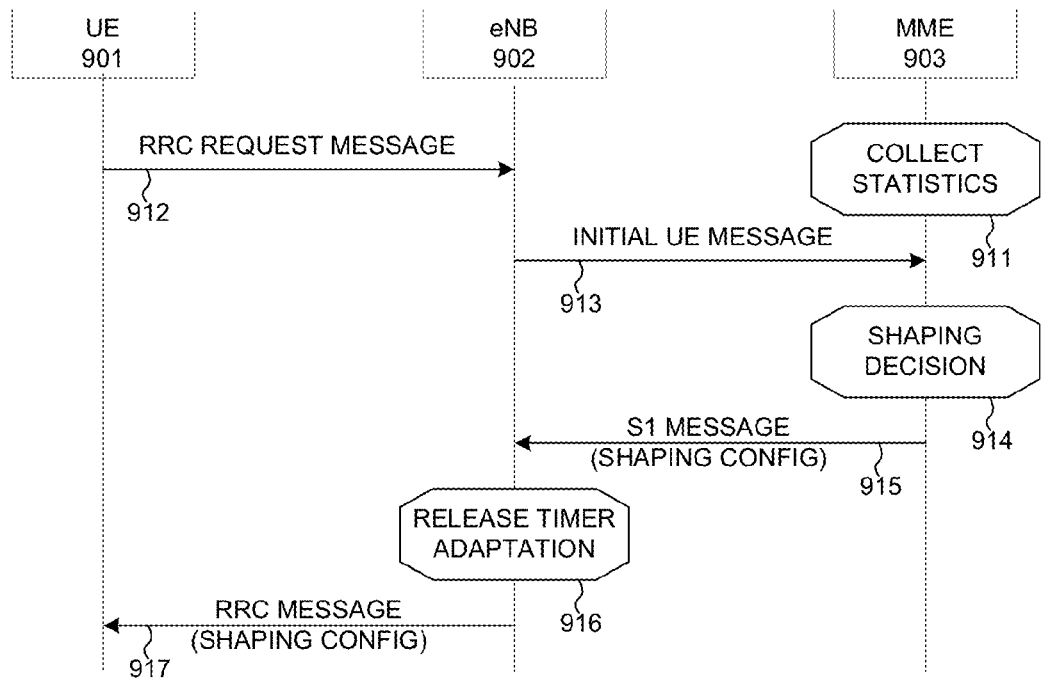
FIG. 9 illustrates one embodiment of MME controlled uplink shaping signaling procedure.

FIG. 9 illustrates one embodiment of MME-controlled uplink shaping signaling procedure. In this embodiment, the MME collects statistics and recommends the shaping mechanism and corresponding parameters to the UE and the eNB. The statistics may include 1) UE cell change count per unit time; 2) UE tracking area update count per unit time; 3) UE RRC transition count per unit time; 4) UE traffic inter-arrival time and packet size; 5) the average duration of UE in RRC Connection mode, 6) UE class (e.g., M2M device), and 7) subscription plan. The MME may initiates the statistics when the signaling loading is high and the reduction of signaling overhead is required, when a default bearer is configured but traffic pattern is diverse, or when UE capability supports shaping. Normally, the MME updates shaping configuration when UE enters RRC Connected mode. However, MME could also page a single or a group of UE just to update the shaping configuration.

In the example of FIG. 9, in step 911, MME 903 stores UE context and collects statistics. In step 912, UE 901 sends RRC request message to eNB 902. In step 913, eNB 902 sends initial UE message to MME 903. Based on the statistics, MME could suggest eNB on RRC parameters, e.g., RRC release timer. Alternatively, eNB may forward its RRC parameter to MME as assistant information for deciding the shaping mechanism. UE may also provide assistance information such as traffic pattern to MME through new procedure or existing signaling. In the example of FIG. 9, in step 914, MME 903 makes shaping decision and forwards the shaping configuration the eNB 902 (step 915). In step 916, eNB 902 performs RRC release timer adaptation based on the shaping configuration. In step 917, eNB 902 sends RRC release timer to UE 901 via RRC messaging.

In LTE systems, a registered UE normally has to synchronize with MME periodically, e.g., periodic tracking are update (TAU). Such signaling should not be prohibited by any uplink shaping mechanism. Furthermore, when UE enters RRC Connected mode due to uplink signaling and there is buffered data, UE should indicate in the connection request (e.g., buffer status report (BSR)) and use the opportunity to clear the buffer.

It is known that LTE systems use Access Class Barring (ACB) mechanism to prevent network congestion. According to respective class and barring parameters, fractions of UEs are barred to access the network. The effect of uplink shaping is similar to ACB especially when controlled by eNB. The interaction between ACB and uplink shaping can have two options. In a first option, UE performs uplink shaping and then applies ACB. When uplink shaping is ongoing, UE checks ACB when the condition of terminating shaping has been satisfied. If the UE is barred, it buffers arrival packets until barring time is expired. If UE is not barred, it initiates RRC connection request. The latency due to ACB may be considered when setting the delay bound. UE may cancel uplink shaping if it has been barred for a long time already. In a second option, UE performs ACB and uplink shaping in parallel. UE keeps buffering arrival data when one of the conditions has not been met: 1) UE is barred or barring timer is expired; or 2) the condition of stopping the uplink shaping has been satisfied. If all the conditions have been met, then UE initiates RRC connection request.

Figure 10:
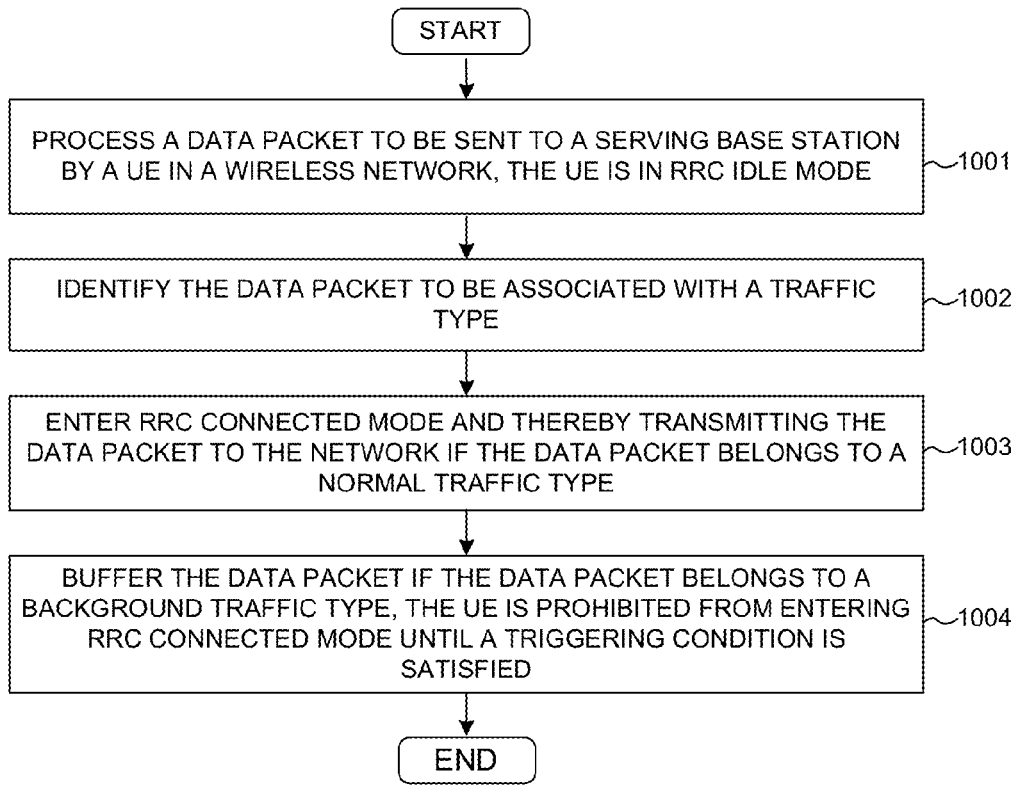
FIG. 10 is a flow chart of a method of UE uplink shaping in RRC Idle mode in accordance with one novel aspect.

FIG. 10 is a flow chart of a method of UE uplink shaping in RRC Idle mode in accordance with one novel aspect. In step 1001, a user equipment (UE) processes a data packet to be sent to a serving base station (eNB) in a wireless network.

The UE is in RRC Idle mode. In step 1002, the UE identifies the data packet to be associated with a traffic type. In step 1003, if the data packet belongs to a normal traffic type, then the UE enters RRC Connected mode and thereby transmitting the data packet to the network. In step 1004, if the data packet belongs to a background traffic type, then the UE buffers the data packet and the UE is prohibited from entering RRC Connected mode until a triggering condition is satisfied for uplink transmission. The background traffic type is associated with UE in a background mode and/or the data packet has a low QoS requirement and/or the data packet has a small packet size.

In one embodiment, the triggering condition belongs to one of the following: the UE entering RRC Connected mode, fulfilling a predefined buffer, delaying the date packet for a periodicity, at least one of the buffered data packets has reached a delay bound, a channel quality is above a channel quality threshold, and a UE speed is slower than a speed threshold.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   processing a data packet to be sent to a base station by a user equipment (UE) in a wireless network, wherein the UE is in radio resource control (RRC) Idle mode;
   identifying the data packet to be associated with a traffic type;
   entering RRC Connected mode and thereby transmitting the data packet to the network if the data packet belongs to a normal traffic type;
   selecting a triggering conditions by the UE from a plurality of predefined triggering conditions based on a plurality of predefined UE conditions; and
   buffering the data packet if the data packet belongs to a background traffic type, wherein the UE is prohibited from entering RRC Connected mode until the triggering conditions is satisfied.

2. The method of claim 1, wherein the predefined triggering conditions comprising: the UE entering RRC Connected mode, fulfilling a predefined buffer, delaying the date packet for a periodicity, at least one of the buffered data packets has reached a delay bound, a channel quality is above a channel quality threshold, and a UE speed is slower than a speed threshold.

3. The method of claim 2, wherein the predefined buffer size is based on at least one of a physical memory size, a number of bytes carried in each subframe, and one or more running applications on the UE.

4. The method of claim 2, wherein the periodicity is based at least one of a prohibit time determined by the UE, a prohibit time determined by the base station, and a prohibit time determined by a mobility management entity (MME).

5. The method of claim 4, wherein a value of the prohibit time is decided according to at least one of a paging cycle, a tracking area update timer, traffic statistics, and a default DRX cycle.

6. The method of claim 2, wherein the delay bound is controlled by a common value determined by the UE and/or one or more running applications on the UE.

7. The method of claim 2, wherein the channel quality threshold is controlled by a predefined RSRP or a predefined RSRQ or path loss value determined by the UE, by the base station, or by a mobility management entity (MME).

8. The method of claim 2, wherein the UE speed threshold is controlled by a predefined cell change count or physical speed or mobile state determined by the UE, by the base station, or by a mobility management entity (MME).

9. The method of claim 2, wherein the predefined UE conditions comprising: the channel quality of the UE, the UE speed, a UE battery life, a UE screen status, a traffic type, and network loading.

10. The method of claim 1, further comprising:
    sending an indication to the network whether the prohibition is applied and related parameters.

11. The method of claim 10, wherein the UE receives an RRC release timer from the base station based on the indication.

12. The method of claim 10, wherein the UE is releasing to RRC Idle mode by the base station based on the indication.

13. The method of claim 1, wherein the UE receives control information related to the prohibition from the network.

14. The method of claim 13, wherein the control information comprises information on configuring the predefined buffer size, configuring the periodicity, and/or activating/deactivating the prohibition.

15. The method of claim 1, wherein the background traffic type is associated with UE in a background mode and/or the data packet has a low QoS requirement and/or the data packet has a small packet size.

16. A user equipment (UE), comprising:
    an uplink shaping controller that processes a data packet to be sent to a base station by a user equipment (UE) in a wireless network and selects a triggering conditions from a plurality of predefined triggering conditions based on a plurality of predefined UE conditions, wherein the UE is in radio resource control (RRC) Idle mode, and wherein the data packet is associate with a traffic type;
    a transmitter that transmits the data packet to the network if the data packet belongs to a normal traffic type after entering RRC Connected mode; and
    a data buffer that buffers the data packet if the data packet belongs to a background traffic type, wherein the UE is prohibited from entering RRC Connected mode until the triggering condition is satisfied.

17. The UE of claim 16, wherein the predefined triggering conditions comprising: the UE entering RRC Connected mode, fulfilling a predefined buffer, delaying the date packet for a periodicity, at least one of the buffered data packets has reached a delay bound, a channel quality is above a channel quality threshold, and a UE speed is slower than a speed threshold.

18. The UE of claim 17, wherein the predefined UE condition comprising: the channel quality of the UE, the UE speed, a UE battery life, a UE screen status, a traffic type, and network loading.

19. The UE of claim 16, wherein the UE sends an indication to the network whether the prohibition is applied and related parameters.

20. The UE of claim 16, wherein the UE receives control information related to the prohibition from the network.

* * * * *

UNITED STATES PATENT AND TRADEMARK OFFICE
CERTIFICATE OF CORRECTION

PATENT NO. : 10,051,507 B2
APPLICATION NO. : 14/320894
DATED : August 14, 2018
INVENTOR(S) : Chia-Chun Hsu et al.

Page 1 of 1

It is certified that error appears in the above-identified patent and that said Letters Patent is hereby corrected as shown below:

In the Claims

Column 11, Line 46, Claim 2 the word "date" should be "data"

Column 12, Line 51, Claim 3 the word "date" should be "data"

Signed and Sealed this
Twenty-third Day of October, 2018

Andrei Iancu
*Director of the United States Patent and Trademark Office*